United States Patent
Sandman et al.

(10) Patent No.: US 9,341,291 B2
(45) Date of Patent: May 17, 2016

(54) DAMPER ACCESS ASSEMBLY

(75) Inventors: Joseph P. Sandman, Morrow, OH (US);
Michael N. Sandman, Morrow, OH (US)

(73) Assignee: Langdon Incorporated, Cincinnati, OH (US)

( * ) Notice: Subject to any disclaimer, the term of this patent is extended or adjusted under 35 U.S.C. 154(b) by 919 days.

(21) Appl. No.: 13/488,881

(22) Filed: Jun. 5, 2012

(65) Prior Publication Data

US 2013/0324028 A1 Dec. 5, 2013

(51) Int. Cl.
| | |
|---|---|
| *F16L 23/16* | (2006.01) |
| *F16L 23/06* | (2006.01) |
| *F24F 13/10* | (2006.01) |
| *F16L 21/00* | (2006.01) |
| *F16L 21/035* | (2006.01) |
| *F16L 25/08* | (2006.01) |
| *F16L 25/14* | (2006.01) |
| *F24F 13/02* | (2006.01) |

(52) U.S. Cl.
CPC .............. *F16L 23/06* (2013.01); *F16L 21/002* (2013.01); *F16L 21/035* (2013.01); *F16L 25/08* (2013.01); *F16L 25/14* (2013.01); *F24F 13/0209* (2013.01); *F24F 13/10* (2013.01)

(58) Field of Classification Search
CPC ..... F24F 13/0209; F24F 13/029; F24F 13/10; F24F 2221/36; F16L 23/06; F16L 2/002; F16L 21/035; F16L 25/08; F16L 25/14
USPC ............ 454/333, 363, 369, 370; 285/33, 364, 285/405, 406
See application file for complete search history.

(56) References Cited

U.S. PATENT DOCUMENTS

| | | | |
|---|---|---|---|
| D135,112 S | 2/1943 | Jamison et al. | |
| 2,775,806 A | 1/1957 | Love | |
| 3,782,411 A * | 1/1974 | Turner | 137/467 |
| 4,184,288 A * | 1/1980 | Magill et al. | 49/7 |
| D275,059 S | 8/1984 | Hoeffler | |
| 4,885,122 A | 12/1989 | Stapleton | |
| 5,095,942 A * | 3/1992 | Murphy | 137/561 A |

(Continued)

OTHER PUBLICATIONS

SMACNA Fire Damper Guide, Fifth Edition, Sep. 2002, Chapter 5, Fire Damper Installation, pp. 51-5.13; Chapter 7, Damper Types, pp. 7.1-7.6; and Chapter 8, Access Doors and Fire Doors, pp. 8.1-8.3.

*Primary Examiner* — Gregory Huson
*Assistant Examiner* — Dana Tighe
(74) *Attorney, Agent, or Firm* — Wood, Herron & Evans, LLP

(57) ABSTRACT

A damper access assembly includes an adapter and a removable damper access duct section for use in a ventilation duct system to access a damper. The adapter includes a radially outwardly directed flange. Each of the ends of the damper access duct section includes a radially outwardly directed flange. The flange of the adapter is configured to be operatively and releasably coupled to one of the flanges of the damper access duct section. The other second flange at the other end of the damper access duct section is configured to be operatively and releasably coupled to the ductwork. A technician may release the damper access duct section from the adapter and from the ductwork and remove the damper access duct section to access the damper. The damper access assembly may include one or more clamps that cooperate with the flanges of the adapter and the removable access duct section.

13 Claims, 11 Drawing Sheets

(56) References Cited

U.S. PATENT DOCUMENTS

| | | | |
|---|---|---|---|
| 5,219,088 A | 6/1993 | Reina et al. | |
| 5,277,458 A | 1/1994 | Tschann | |
| 5,829,106 A | 11/1998 | Dams et al. | |
| D408,178 S | 4/1999 | Schwartz et al. | |
| 5,909,904 A * | 6/1999 | Shea | 285/405 |
| D424,566 S | 5/2000 | Baker | |
| 6,405,411 B1 | 6/2002 | Allemann et al. | |
| D521,147 S | 5/2006 | Sandman et al. | |
| D529,598 S | 10/2006 | Sandman et al. | |
| D534,253 S | 12/2006 | Sandman et al. | |
| D580,748 S | 11/2008 | Polak et al. | |
| 7,523,964 B2 | 4/2009 | Sandman et al. | |
| 7,868,845 B2 | 1/2011 | Gratton et al. | |
| 7,997,112 B2 | 8/2011 | Sandman et al. | |
| D647,394 S | 10/2011 | Taylor | |
| D650,889 S | 12/2011 | van Walraven | |
| D654,785 S | 2/2012 | Clorley | |
| 8,267,556 B2 | 9/2012 | Liu | |
| D703,032 S | 4/2014 | Bigdeliazari | |
| D703,033 S | 4/2014 | Karlsson | |
| D723,362 S | 3/2015 | Bacon | |
| 2002/0074277 A1 * | 6/2002 | Thomassen | 210/323.2 |
| 2005/0184524 A1 * | 8/2005 | Stravitz | 285/903 |
| 2006/0097524 A1 | 5/2006 | Stolzman | |
| 2006/0220395 A1 | 10/2006 | Kuzelka | |
| 2009/0083962 A1 | 4/2009 | Sandman et al. | |
| 2009/0266903 A1 * | 10/2009 | Fitzgerald et al. | 236/49.3 |
| 2009/0294449 A1 | 12/2009 | Taylor | |
| 2010/0038902 A1 | 2/2010 | Sandman et al. | |

* cited by examiner

DAMPER ACCESS ASSEMBLY

FIELD OF THE INVENTION

The present invention relates generally to ventilation duct systems and, more particularly, to an access assembly for use in a ventilation duct system to provide access to a damper.

BACKGROUND OF THE INVENTION

In ventilation duct systems, there are oftentimes a variety of components connected to the duct system that must be periodically inspected, maintained, and repaired, as necessary. Due to their internal construction, however, these components are typically not easily accessible for routine inspection, maintenance, and repair.

One such internal device is a damper. As is known, a damper includes one or more movable plates, blades, or curtains that control the flow of a fluid, usually air, in the duct system. Like many mechanical devices, dampers require preventive maintenance and, in the event of operational failure, replacement or repair. As one particular example, fire dampers are safety devices that are often found in walls or floors of a building and are designed to prevent the rapid spread of flames and hot gases through the building via the ventilation duct system. Fire dampers include a fusible link that, when exposed to excessive heat, causes the damper to abruptly close. The action closes the duct system so that it does not provide an avenue for the spread of fire through the building.

Because some dampers, such as fire dampers, are safety devices, they must be protected from collateral damage to the ductwork so that they maintain their operational effectiveness in the event of an emergency. For example, because fire dampers are designed to prevent the spread of fire through the ductwork in a building, the ductwork operatively coupled to the damper is designed to break away without damage to the damper itself. In this manner, should part of the building collapse adjacent the damper and dislodge or destroy the ductwork leading up to the damper, the ductwork may cleanly separate from the damper so that the integrity of the damper is maintained. Thus, structural failures that are typically associated with a fire may not defeat the purpose of the damper and thereby cause catastrophic or rampant spread of fire through the ductwork.

Normally, access to the fire damper and the link are provided by a small access door in the duct that is located in proximity to the damper. However, these doors, due to their location and orientation on the ductwork and/or proximity to other components of the duct system or other structures in the building, often provide only limited visibility of the fire damper and link and thus make inspection, maintenance, and repair awkward and difficult. In addition, replacement of the damper and/or the link is often not possible via the access door so that their replacement is a time-consuming and expensive endeavor. Often, replacement in this situation may essentially require dismantling of a large portion of the duct system simply to gain physical access to the fire damper.

Thus, there is a need for improved access to dampers that overcome these and other shortcomings and drawbacks of known access doors and breakaway in ventilation duct systems.

SUMMARY OF THE INVENTION

The present invention overcomes the foregoing and other shortcomings and drawbacks of access doors heretofore known for use in ventilation duct systems. While the invention will be described in connection with certain embodiments, it will be understood that the invention is not limited to these embodiments. On the contrary, the invention includes all alternatives, modifications and equivalents as may be included within the spirit and scope of the present invention.

In accordance with the principles of the present invention, a damper access assembly is provided for use in a ventilation duct system that includes ductwork and a damper enclosure enclosing a damper. The damper enclosure has an inlet and an outlet that are operatively coupled to the ductwork.

According to one aspect of the present invention, the damper access assembly includes an adapter and a damper access duct section. The adapter defines a passage therethrough and has a first end and a second end. The first end may be configured to be operatively coupled to one of the inlet or outlet of the damper enclosure. The second end of the adapter includes a first radially outwardly directed flange.

The damper access duct section defines a passage therethrough and has a first end and a second end. Each of the first end and the second end of the damper access duct section includes a second radially outwardly directed flange.

The first flange of the adapter is configured to be operatively and releasably coupled to one of the second flanges of the damper access duct section at one end thereof. And, the other second flange at the other end of the damper access duct section is configured to be operatively and releasably coupled to the ductwork. A technician may release the damper access duct section from the adapter and from the ductwork to remove the damper access duct section relative to the damper enclosure and the ductwork. Removing the damper access duct section from the ventilation duct system permits access to the damper within the damper enclosure. The removable access duct section may be reinstalled by releasably coupling the removable access duct section to each of the ductwork and the adapter.

According to one aspect of the present invention, the damper access assembly further includes one or more clamps that cooperate with the first flange of the adapter and with at least one of the second flanges of the removable access duct section. The clamps are configured to releasably couple the damper access duct section to the adapter and to the ductwork at opposite ends of the damper access duct section. The clamps may include a gasket to form a fluid-tight seal at the joint formed between the adapter and the removable access duct section and/or between the removable access duct section and the ductwork.

According to another aspect of the present invention, the damper access assembly further includes a collar that is configured to be operatively coupled to the inlet or the outlet of the damper enclosure. The collar may be configured to slidably engage the adapter. A gasket may be disposed between the collar and the adapter during installation of the damper access assembly to provide a fluid-tight seal between the collar and the adapter.

According to another aspect of the present invention, there is a ventilation duct system that includes ductwork, a damper enclosure having an inlet and an outlet operatively coupled to the ductwork, a damper enclosed within the damper enclosure, and a damper access assembly. The damper access assembly includes an adapter and a damper access duct section. The adapter defines a passage therethrough and has a first end and a second end. The first end is operatively coupled to one of the inlet or outlet of the damper enclosure, and the second end includes a first radially outwardly directed flange.

The damper access duct section defines a passage therethrough and has a first end and a second end. Each of the first end and the second end of the damper access duct section includes a second radially outwardly directed flange at the respective first end and second end. The first flange of the adapter is operatively and releasably coupled to one of the second flanges of the damper access duct section at one end thereof. And, the other second flange at the other end of the damper access duct section is operatively and releasably coupled to the ductwork. A technician may release the damper access duct section from the adapter and from the ductwork to remove the damper access duct section relative to the damper enclosure and the ductwork. Removing the damper access duct section from the ventilation duct system permits access to the damper within the damper enclosure.

According to another aspect of the present invention, the damper is selected from a group consisting of a fire damper, a balancing damper, a control damper, a fire smoke damper, a backdraft damper, and a smoke damper.

According to another aspect of the present invention, there is a damper assembly for use in a ventilation duct system including ductwork. The damper assembly includes a damper enclosure having end walls that define an inlet and an outlet for operatively coupling the damper enclosure to the ductwork. A collar extends from at least one of the inlet and the outlet and is configured to be slidably coupled to the ductwork. A gasket is disposed on the collar to sealingly engage the ductwork and form a fluid tight seal with the ductwork when the damper assembly is operatively coupled thereto. A damper maybe secured within the damper enclosure to regulate the flow of fluid between the inlet in the outlet.

The above and other objectives and advantages of the present invention shall be made apparent from the accompanying drawings and the description thereof.

BRIEF DESCRIPTION OF THE DRAWINGS

The accompanying drawings, which are incorporated in and constitute a part of this specification, illustrate an embodiment of the invention and, together with the general description of the invention given above and the detailed description of embodiments given below, serve to explain the principles of the present invention.

DETAILED DESCRIPTION OF THE INVENTION

Figure 1:
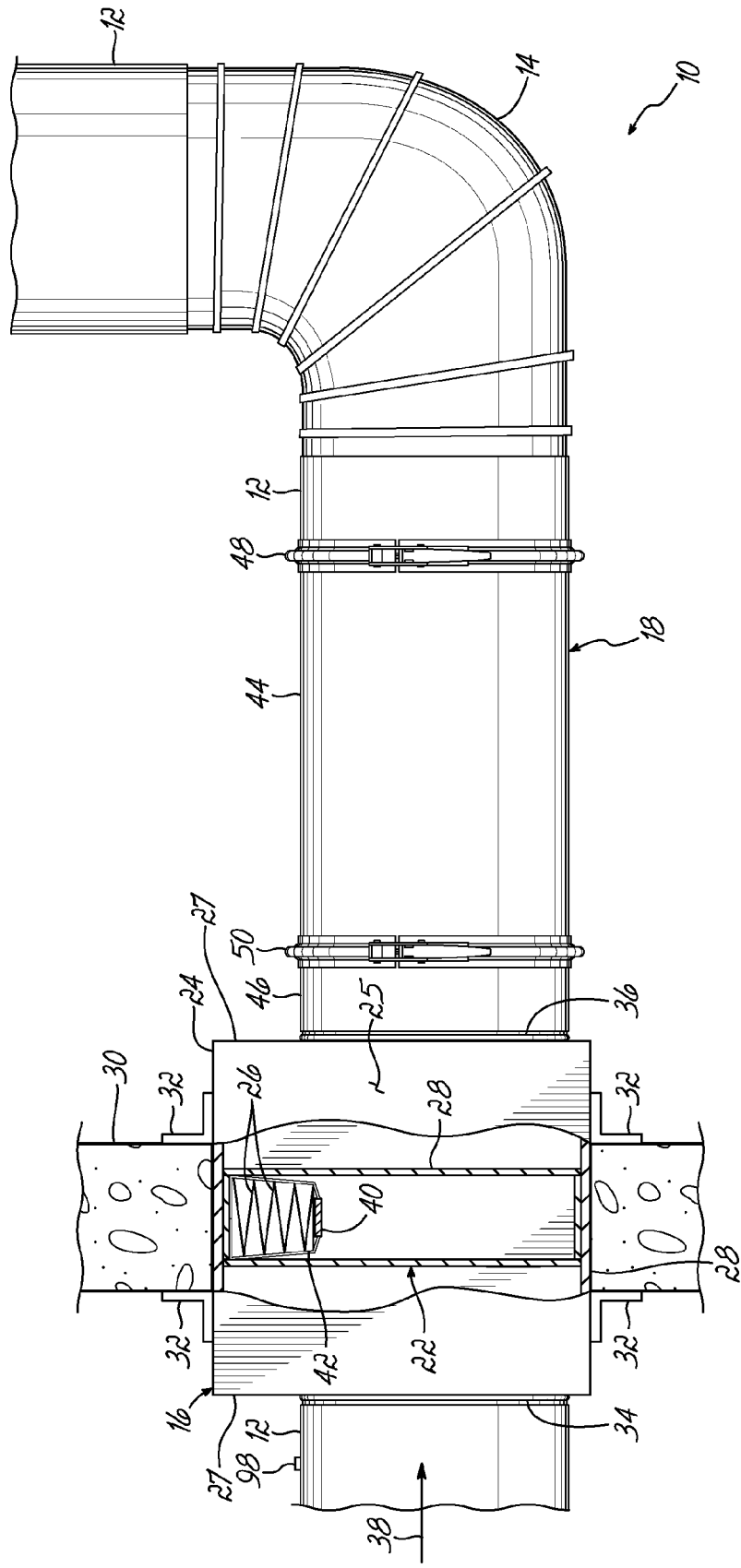
FIG. 1 is a partial cross-sectional side elevational view of an exemplary ventilation duct system according to one embodiment of the present invention.

Referring now to the figures, and to FIG. 1 in particular, an exemplary ventilation duct system 10 is shown in accordance with the principles of the present invention. The duct system 10 may include ductwork of various types of duct components, such as, multiple ventilation duct runs 12 and an elbow 14. The duct system 10 further includes a damper assembly 16 and a damper access assembly 18, each described in more detail below, which are interconnected at joints to form the duct system 10. The duct system 10 may be configured to direct the flow of a fluid, for example, air, to various parts of a building.

For example, the duct system 10 may form one branch of a heating, ventilation, and air conditioning (HVAC) system in a building. While the exemplary ventilation duct system 10 is shown including specific ductwork, it will be appreciated that other types and configurations of ductwork are also known to those of ordinary skill in the art and are also possible without departing from the spirit and scope of the present invention. For example, although not shown, the ductwork may include one or more sleeve couplings to couple adjacent ducts 12 together as well as one or more duct reducers to couple ducts of different cross-sectional dimensions together.

As will be described in greater detail below, all or a portion of the damper access assembly 18 may be easily removed from the duct system 10 thereby permitting visual and/or physical access to internal components of the duct system 10. For example, the damper access assembly 18 may allow access to the internal components of the damper assembly 16 that are not generally assessable through an access door (not shown).

To that end, and with continued reference to FIG. 1, the damper assembly 16 may include a damper 22 secured within an enclosure 24. Further, the damper 22 may include a plurality of blades 26 mounted within a frame 28. The blades 26 may be oriented or controlled to regulate the flow of fluid through the damper assembly 16. The frame 28 may be secured to the enclosure 24. The enclosure 24 may include one or more sidewalls 25 and opposing end walls 27 extending transversely from the sidewall 25. When installed, the enclosure 24 may be secured to the structure of the building, such as to a wall 30, by retaining angles 32 between the sidewall 25 and the wall 30 so as to align the damper 22 with the wall 30, as shown. However, embodiments of the present invention are not limited to the relative orientation or position of the damper 22 relative to the building structure. For example, the damper 22 may be offset from the wall 30. This may be the case for smoke dampers which may be installed at or adjacent to the point where the duct passes through a smoke barrier (not shown).

The damper assembly 16 may include an inlet 34 and an outlet 36 operatively coupled to the ductwork. In the exemplary embodiment shown in FIG. 1, the inlet 34 and the outlet 36 are each defined by the endwalls 27. With this construction, the damper assembly 16 may operate to throttle or regulate a flow of a fluid (indicated by arrow 38) between the inlet 34 and the outlet 36. By way of example only, the fluid may be air or other gases. Embodiments of the present invention are not, however, limited to any specific fluid. While the inlet 34 and the outlet 36 are shown and described in a particular orientation shown in FIG. 1, this orientation is merely exemplary. It will be appreciated that the inlet 34 and the outlet 36 may be reversed from that shown. Furthermore, the flow of fluid through the damper assembly 16 may be reversed during use of the duct system 10. As such, embodiments of the present invention are not limitedto the specific direction of the flow of fluid as indicated in FIG. 1.

In this exemplary configuration, removal of all or a portion of the damper access assembly 18 may permit a technician to visually inspect, maintain, and repair components found in the enclosure 24, such as the damper 22. In this regard, the damper 22 may be any one type of a variety of types of dampers including, by way of example only, a fire damper, a balancing damper, a control damper, a fire smoke damper, a backdraft damper, or a smoke damper, to name only a few. As such, the damper assembly 16 may further include additional components. For example, when the damper 22 is a fire damper, and with reference to FIG. 1, the damper assembly 16 may further include a fusible link 40 and a strap 42. As is known, exposing the fusible link 40 to sufficient heat will cause the strap 42 to release the blades 26. Gravity or a spring extends the blades 26 across the frame 28 to close off the inlet 34 from the outlet 36 to prevent or at least inhibit the spread of a fire through the wall 30. Though not shown, dampers may further include springs, guide tracks, and other components depending on the type and function of the damper. Advantageously, removal of a portion of the damper access assembly 18 then provides an avenue for inspection, maintenance, and/or repair of various components located internal to the damper assembly 16.

Furthermore, while the damper assembly 16 is shown to include a vertically oriented damper, it will be appreciated that embodiments of the present invention are not limited to ventilation duct systems having vertically oriented dampers. In this regard, horizontal style dampers are known and are often used in floors or in other locations that require a horizontal orientation. Embodiments of the present invention allow inspection, maintenance, and repair of horizontal dampers and other components that are internally located in the duct system 10.

As described above, and with reference to FIGS. 1-3, the damper access assembly 18 allows a technician to easily access these and other internal components. To that end, and in one embodiment, the damper access assembly 18 includes a damper access duct section 44 and an adapter 46. In the installed position, as shown in FIGS. 1 and 2, the damper access assembly 18 may be operatively coupled to the damper assembly 16 at one end thereof and to the duct 12 at the other end thereof.

In particular, in the embodiment shown, one end of the damper access duct section 44 is operatively coupled to the duct 12, and the adapter 46 is operatively coupled to the damper assembly 16 at the outlet 36 of the damper enclosure 24. As shown, the damper access duct section 44 may be coupled to the duct 12 with a clamp 48 at one end thereof and may be coupled to the adapter 46 with a clamp 50 at the other end thereof. As is described in more detail below, the damper access duct section 44 may be disconnected from the duct system 10 by removing clamps 48 and 50 to allow the damper access duct section 44 to be removed relative to the damper enclosure 24 and the ductwork, such as, the duct 12, to permit access to internal components found in the duct 12 and/or the damper assembly 16, such as the damper 22.

Figure 2:
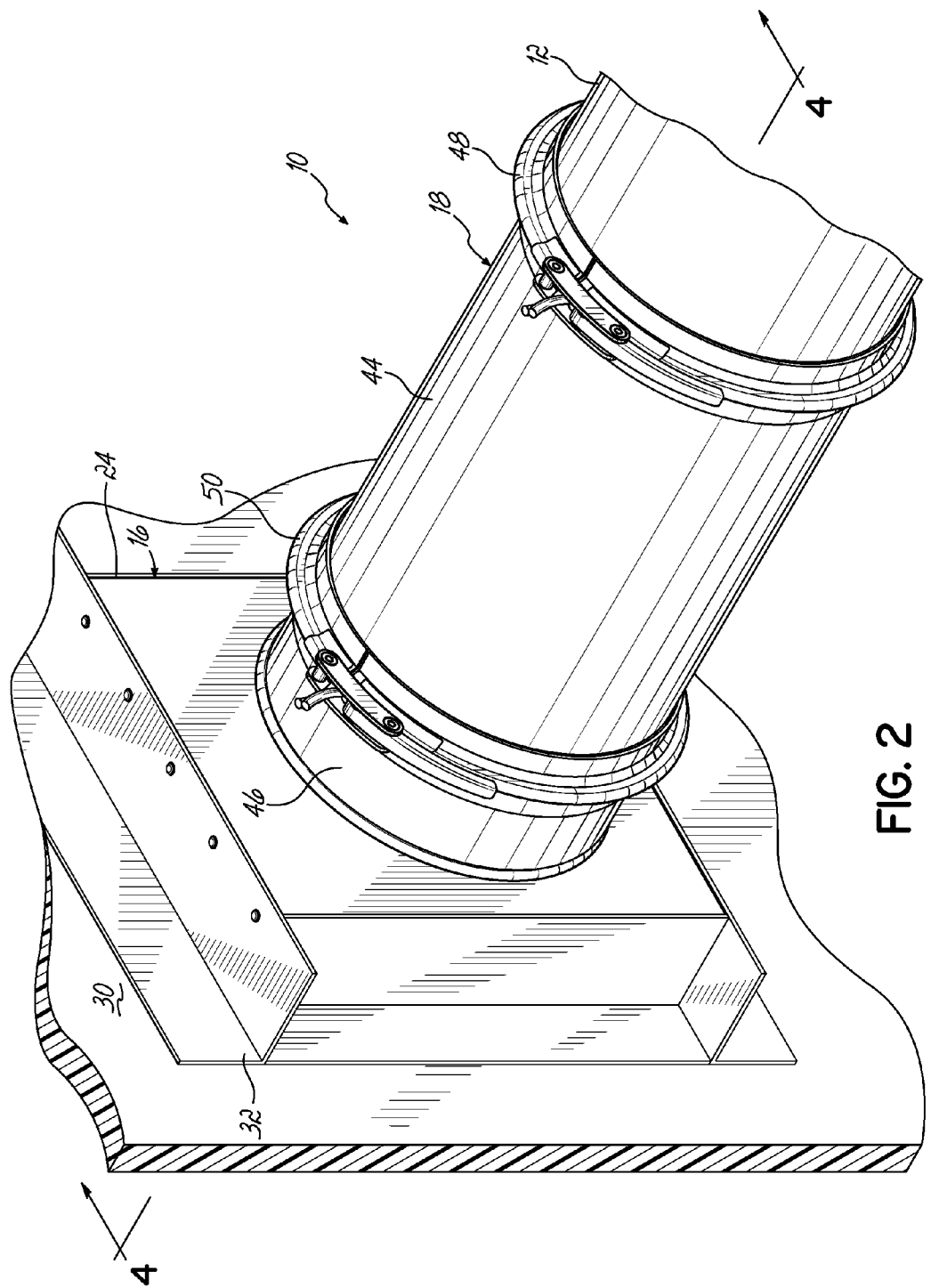
FIG. 2 is a perspective view of a portion of the ventilation duct system of FIG. 1 according to one embodiment of the present invention.
Figure 3:
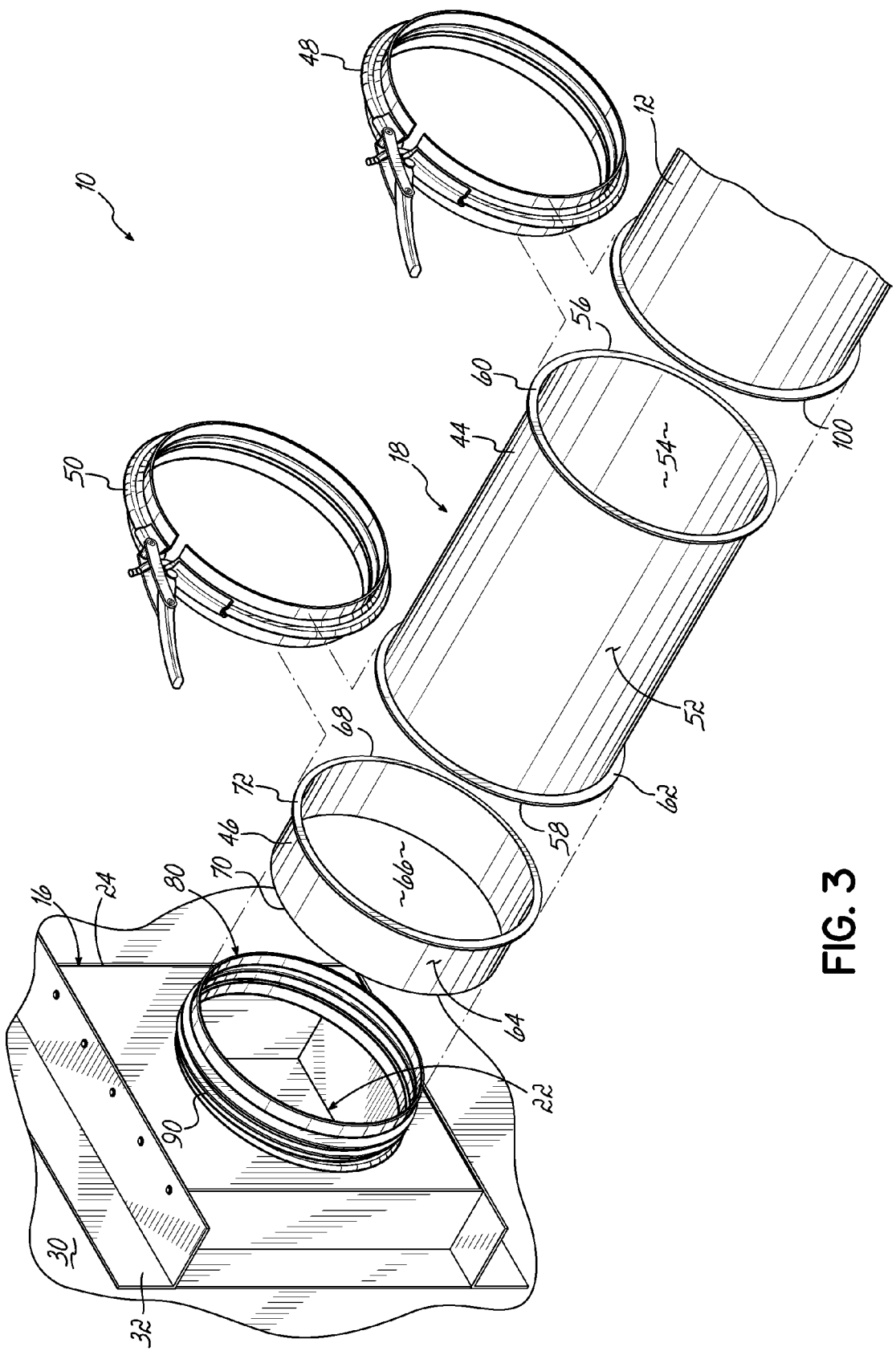
FIG. 3 is an exploded perspective view of the embodiment shown in FIG. 2.
Figure 4:
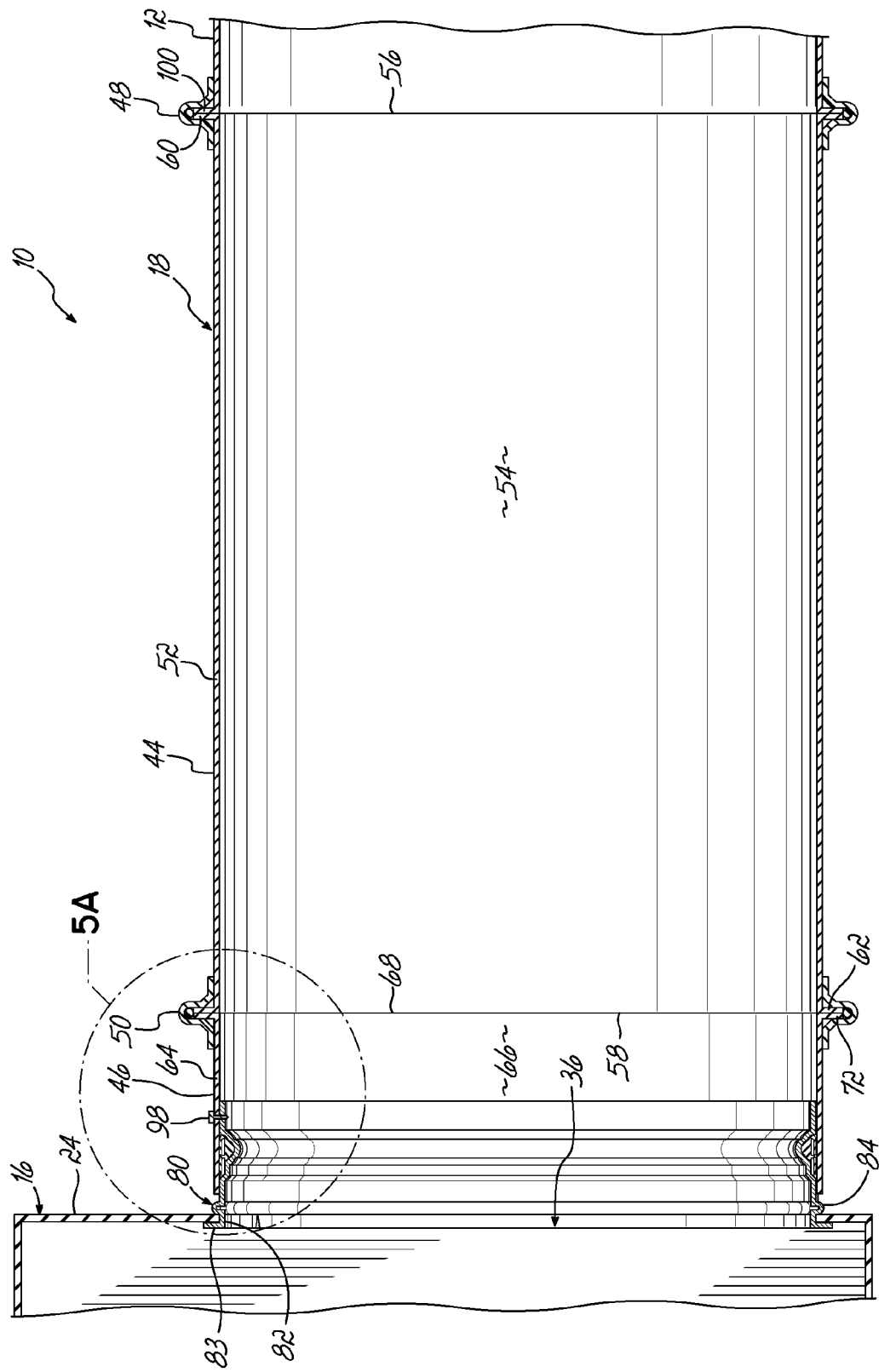
FIG. 4 is a cross-sectional view of the embodiment shown in FIG. 2 taken along section line 4-4.

With reference to FIGS. 2, 3, and 4, in which like reference numerals refer to like features, the damper access duct section 44 has a sidewall 52 that defines a passage 54 along an internal surface thereof. In the embodiment shown, the damper access duct section 44 has a tubular configuration and may have a cylindrical shape. It will be appreciated, however, that the damper access duct section 44 is not limited to cylindrical shapes as other cross-sectional shapes are contemplated, for example, rectangular or oval cross-sectional shapes. The passage 54 may be in direct contact with the fluid flow from the damper assembly 16. However, the damper access duct section 44 may include a liner (not shown), such as, internal insulation, along the internal surface of the sidewall 52 so that the passage 54 is defined by the liner. Similarly, the external surface of the sidewall 52 may be covered by an external liner (not shown), such as, external insulation.

The sidewall 52 has ends 56 and 58 each having a respective radially outwardly directed flange 60, 62. In one embodiment, one or both of the radially outwardly directed flanges 60, 62 are integrally formed with the sidewall 52. Integrally forming the flanges 60, 62 may be achieved by one or more of the methods disclosed in U.S. Pat. No. 7,997,112; U.S. Publication No. 2009/0083962; and U.S. Publication No. 2010/0038902, which are assigned to the assignee of the present invention and are incorporated by reference herein in their entireties. Alternatively, the flanges 60, 62 may be formed with a van stone machine, by way of example, or any other conventional method.

As described above, the adapter 46 is operatively coupled to the damper access duct section 44 and the damper assembly 16. In that regard, the adapter 46 includes a sidewall 64 that defines a passage 66. The sidewall 64 has ends 68 and 70. At least one of the ends 68 and 70 has a radially outwardly directed flange 72. In one embodiment, the flange 72 may be formed by one of the methods disclosed above with regard to forming one or both of the flanges 60, 62. In the embodiment shown, the damper access duct section 44 has a tubular configuration and may have a cylindrical shape. However, like the damper access duct section 44 described above, it will be appreciated, that the adapter 46 is not limited to cylindrical shapes as other cross-sectional shapes are contemplated, for example, rectangular or oval cross-sectional shapes. Further, embodiments of the invention are not limited to the adapter 46 and the damper access duct section 44 having the same shape, as is described in detail below.

More specifically, as shown in FIGS. 3 and 4, at the joint between the damper access duct section 44 and the adapter 46, the adapter 46 via the flange 72 may be operatively coupled to the damper access duct section 44 via the flange 62. For example, the clamp 50 may engage each of the flanges 62 and 72 to force them toward one another so as to removably secure the damper access duct section 44 to the adapter 46.

Figure 5A:
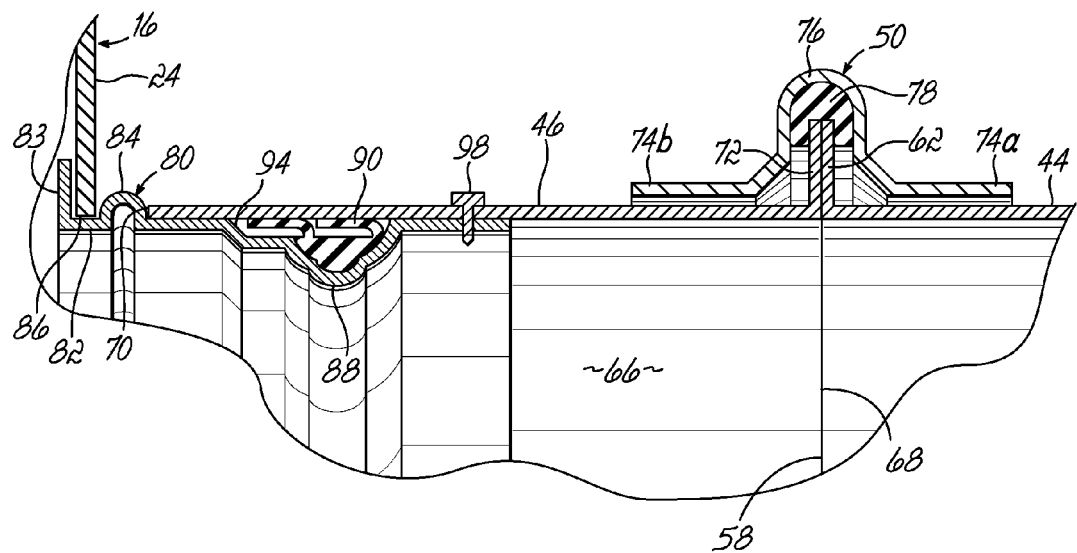
FIG. 5A is an enlarged view of the encircled area 5A of FIG. 4 illustrating one embodiment of a joint.

In one embodiment, and with reference to FIG. 5A, the flanges 62 and 72 may align with one another in a direct abutting relationship. That is, when the damper access assembly 18 is in an installed position, an outwardly facing surface of the flange 62 and an outwardly facing surface of the flange 72 may be in contact with the one another. The clamp 50 may be disposed over the flanges 62 and 72 so as to operatively couple the damper access duct section 44 and the adapter 46 and prevent unintentional separation thereof.

In this regard, the clamp 50 may include clamp legs 74a, 74b and a loop portion 76 formed between and joining clamp legs 74a, 74b. The clamp 50 may also include a gasket member 78 positioned proximate the loop portion 76. The gasket member 78 may span across the interface between the flange 62 and the flange 72 so as to inhibit or prevent travel of fluid through any gap that may exist between the flange 62 and the flange 72 thereby forming a fluid-tight seal between the damper access duct section 44 and the adapter 46.

Figure 5B:
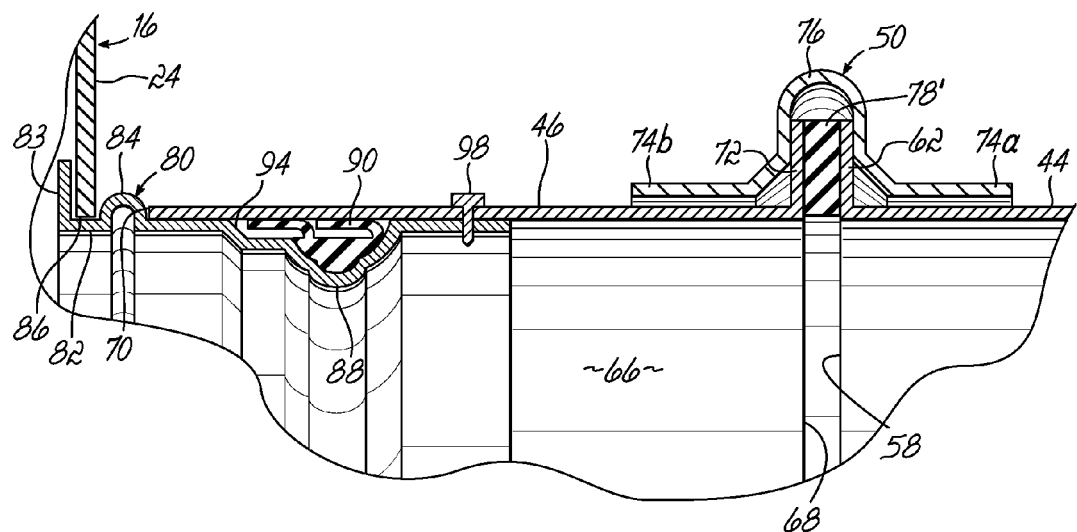
FIG. 5B is an enlarged view of the encircled area 5A of FIG. 4 illustrating an alternative embodiment of the joint to that shown in FIG. 5A.

In an alternative embodiment of the clamp 50, shown in FIG. 5B, the flange 62 and the flange 72 are separated by a gasket member 78' rather than the flange 62 and the flange 72 abutting one another. The clamp 50 may then engage the opposing flanges 62 and 72 to operatively couple the adapter 46 and the damper access duct section 44 and prevent unintentional separation thereof and to provide a fluid-tight seal therebetween. Clamp 48 may be similar to clamp 50. Clamps, such as clamps 48 and 50 are disclosed in commonly owned U.S. Pat. No. 7,997,112; U.S. Publication No. 2009/0083962; and U.S. Publication No. 2010/0038902, as set forth above.

While the embodiments disclosed herein describe the clamp 50 as coupling the damper access duct section 44 and the adapter 46 together, it will be appreciated that other clamps capable of securing these components together may be used in accordance with embodiments of the present invention disclosed herein. By way of example only, and not limitation, clamps 48 and 50 may be angle ring-type clamps with a fastener connecting opposing flanges, a drawband clamp, and a barrel clamp.

As introduced above, and with reference to FIGS. 3, 4, and 5A and 5B, the adapter 46 is operatively coupled to the damper assembly 16. In this regard and in one embodiment, the damper assembly 16 includes a collar 80, which may be a separate component attached to the enclosure 24, as shown, by bending metal tabs 83 around the edge 86 of the enclosure 24 that defines the outlet 36 or may be integral to the enclosure 24. However, there are many ways by which the collar 80 may be attached to the enclosure 24, for example, by welding or spot welding, and embodiments of the present invention are not limited to any particular method. The enclosure 24 may have sidewalls and end walls to more fully enclose the damper 22.

In the embodiment shown, the collar 80 may include a sleeve coupling 82 that extends generally perpendicular to the radially outwardly directed tab 83. The sleeve coupling 82 may further include a radially outwardly directed annular bead 84 spaced apart from the tab 83 so as to provide a recess into which the edge 86 of the enclosure 24 may extend when the collar 80 is attached to the enclosure 24.

As shown best in FIGS. 5A and 5B, the sleeve coupling 82 may further include a radiused bottom wall 88. The bottom wall 88 may have a generally constant radius of curvature although other curved or arcuate shapes of the bottom wall 88 are also contemplated. A gasket 90 may be positioned within and conform to the bottom wall 88. The gasket 90 may be configured as a double lip seal including a pair of annular sealing flanges 92a and 92b (shown best in FIG. 6A). The sealing flanges 92a and 92b may extend radially outward to sealingly engage the adapter 46, such as along the passage 66, when the adapter 46 is positioned on the collar 80 during installation of the damper access assembly 18. Thus, the flanges 92a and 92b may limit or restrict ingress or egress of fluid between the adapter 46 and the collar 80. It will be appreciated that the gasket 90 shown is merely exemplary as the gasket 90 may have any number of different configurations from that shown while forming a fluid-tight seal between the collar 80 and the adapter 46. Embodiments of the present invention are thus not limited to any particular configuration of the gasket. Exemplary gaskets suitable for use in embodiments of the present invention are disclosed in commonly owned U.S. Pat. No. 7,523,964; D534,253; and D529,598, which are assigned to the assignee of the present invention and are incorporated by reference herein in their entireties. By way of example, other seal configurations may include a circular cross-sectional configuration and a multiple flange configuration, for example, similar to the flanges 92a and 92b, but three or more flanges. Furthermore, each flange in such a configuration may differ from the configuration of adjacent flanges. In this regard, each flange may be of different height or width. The configuration may depend upon the application.

The adapter 46 may be slightly larger in size (e.g., larger in diameter) so that the passage 66 cooperates with the outer surface 94 of the collar 80. In other words, the adapter 46 may slip over and surround the collar 80 with the sealing flanges 92a and 92b engaging the passage 66. The end 70 of the adapter 46 may then abut the annular bead 84 when the adapter 46 is fully seated on the collar 80, as shown. In this regard, the annular bead 84 may operate as a stop for the adapter 46 and provide a visual confirmation that the adapter 46 is properly installed. In the embodiment shown in FIGS. 4, 5A, and 5B, a fastener 98, such as a sheet-metal screw, may pass through each of the adapter 46 and the collar 80 to limit movement of the adapter 46 relative to the collar 80 during normal operation of the duct system 10.

Figure 6A:
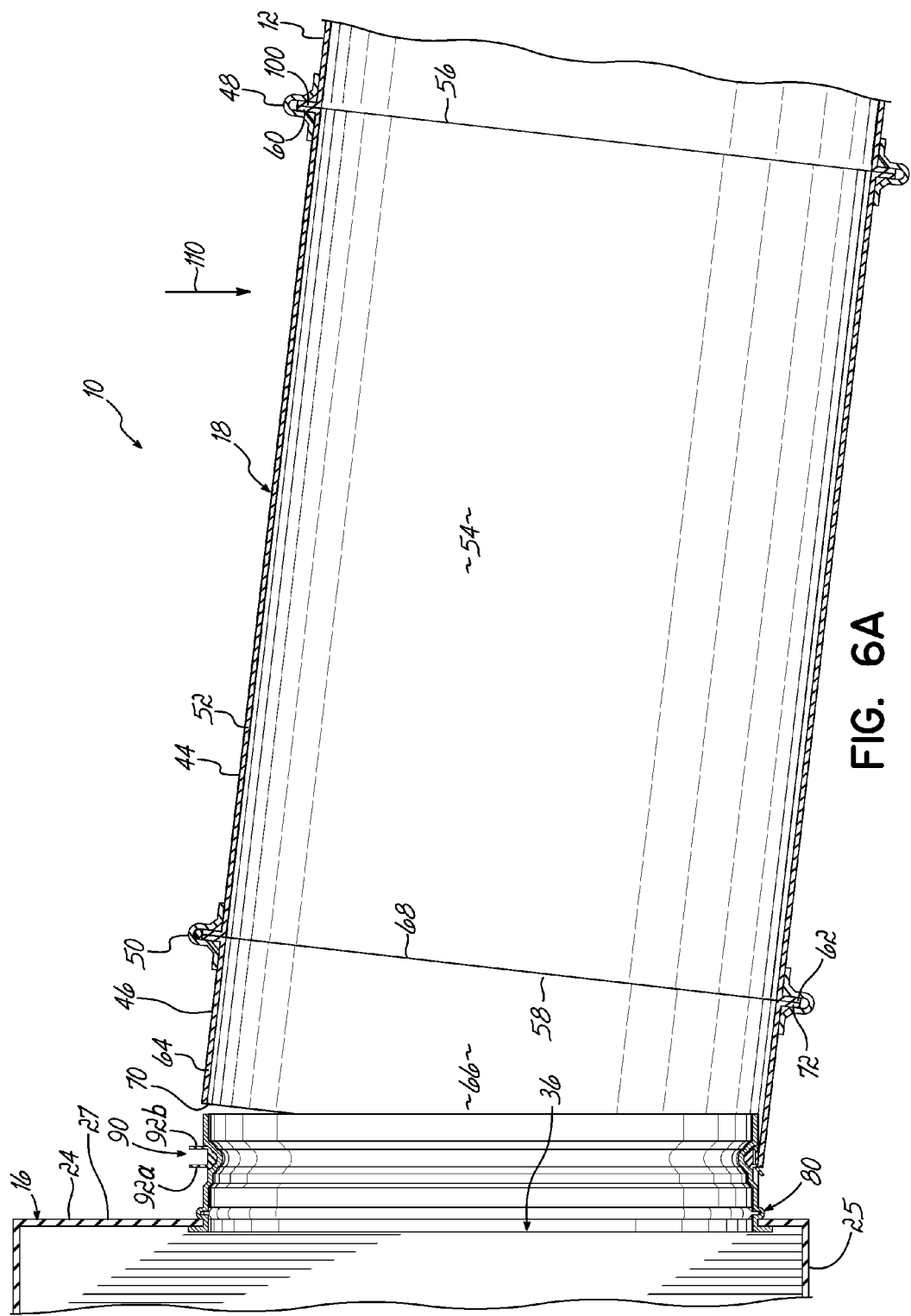
FIG. 6A is a cross-sectional view taken along section line 4-4 of FIG. 2 depicting a breakaway feature of one embodiment of the invention.

Advantageously, and with reference now to FIG. 6A, the slip-type connection between the adapter 46 and the collar 80, even if secured with one or more fasteners 98, allows the damper access assembly 18 to break away from the collar 80 in an emergency situation. For example, breakaway of the damper access assembly 18 from the collar 80 may occur in the event that the ceiling (not shown) or another portion of the building collapses onto a portion of the duct system 10 or onto the damper access assembly 18. The application of this type of load to the damper access assembly 18 is indicated by an arrow 110 in FIG. 6. Thus, by way of example only, where the damper 22 is a fire damper, embodiments of the present invention may provide for a breakaway feature so that should the fire damper activate to contain a fire, the integrity of the fire damper in the wall 30 is maintained if a portion of a duct system 10 beyond the collar 80 collapses. The damper access assembly 18, in particular the adapter 46, may separate from the collar 80 in a manner that limits any damage to the damper assembly 16 and specifically to the damper 22.

Figure 6B:
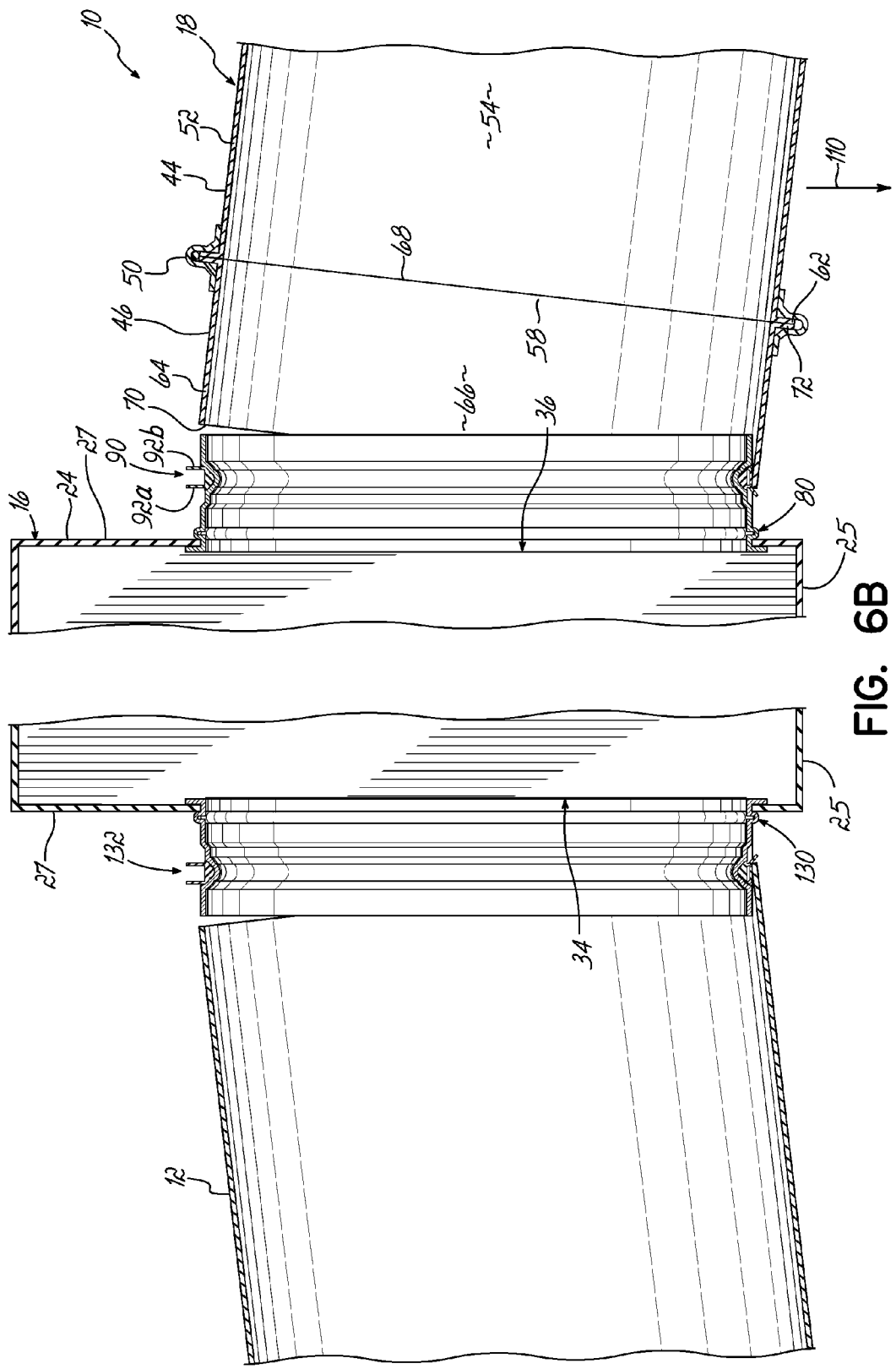
FIG. 6B is a cross-sectional view taken along section line 4-4 of FIG. 2 similar to that of FIG. 6A depicting another breakaway feature of one embodiment of the invention.

Similarly, and with reference to FIGS. 1 and 6B, in the embodiment in which the enclosure 24 includes sidewall 25 and end walls 27, the duct 12 may be operatively coupled to the enclosure 24 by a slip-type connection similar to that described above between the adapter 46 and the collar 80. As shown in FIG. 6B, a collar 130 extends from the end wall 27 that defines the inlet 34. The collar 130 may be similar to the collar 80, described above, though embodiments of the present invention are not limited thereto. A gasket 132 may be disposed on the collar 130 to sealingly engage the duct 12 when the duct 12 is slid over the collar 130. When operatively coupled thereto, duct 12 may be secured in place with one or more fasteners 98 (shown in FIG. 1). Thus, the gasket 132 may substantially prevent fluid leakage between the collar 130 and the duct 12 during normal operation of the duct system 10. However, the slip-type connection between the duct 12 and the collar 130 may allow the duct 12 to break away from the collar 130 in the event that a part of the building structure collapses onto the duct 12. Thus, by way of example only, where the damper 22 is a fire damper, embodiments of the present invention may provide for a breakaway feature so that should the fire damper activate to contain a fire, the integrity of the fire damper in the wall 30 is maintained if a portion of a duct system 10 beyond the collar 130 collapses. The duct 12 may separate from the collar 130 in a manner that limits any damage to the damper assembly 16 and specifically to the damper 22.

Figure 10:
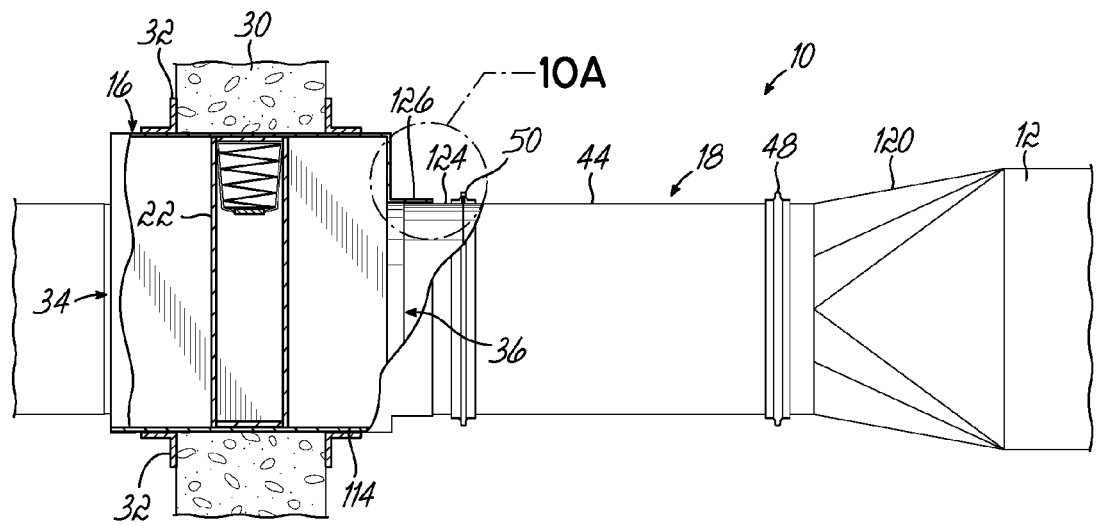
FIG. 10 is a partial cross-sectional plan view of another embodiment of the invention.
Figure 10A:
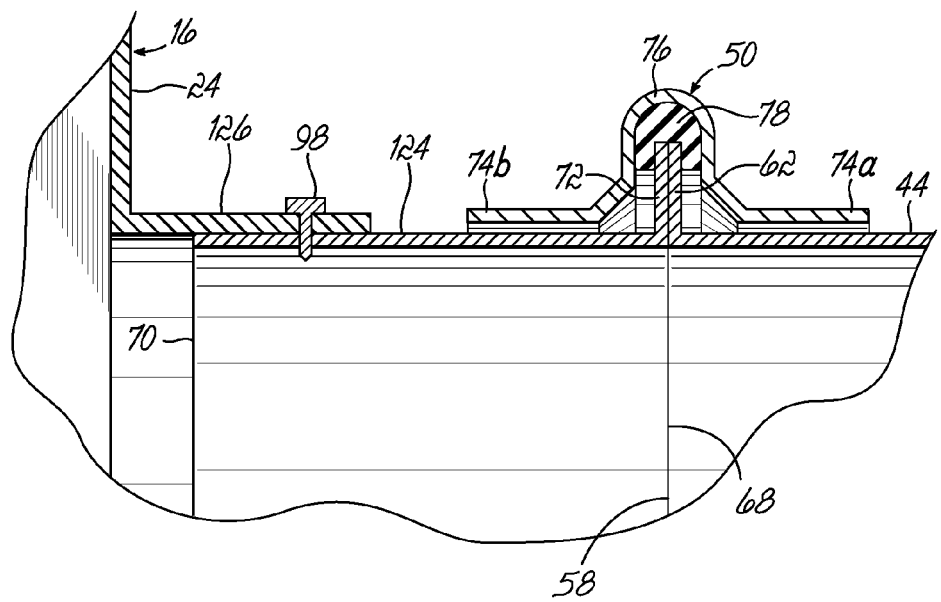
FIG. 10A is an enlarged view of the encircled area 10A in FIG. 10.

In another embodiment of the invention, as shown in FIGS. 10 and 10A, the damper access assembly 18 includes an adapter 124 and the damper access duct section 44. The enclosure 24 may have an integral collar portion 126. In this regard, the enclosure 24 may be configured as a Type C fire damper, as is known in the art. The adapter 124 may be configured to slide inside an integral collar 126 of the enclosure 24. The adapter 124 may be coupled to the integral collar 126 with a fastener 98. Neither the collar 126 nor the adapter 124 may include a gasket or seal, however, a liquid sealant may be used to form a fluid tight seal between the integral collar 126 and the adapter 124. It will be appreciated that, alternatively, the adapter 124 may slide over the outside of the integral collar 126. The joint connections between the adapter 124 and the damper access duct section 44 and between the damper access duct section 44 and the duct 12 may be similar to those as provided above with regard to FIGS. 1-5B.

With reference now to FIGS. 2, 3, and 4, the damper access assembly 18 may be coupled to the duct 12 at end 56. In particular, the flange 60 may cooperate with a flange 100 on the duct 12. In this regard, the flange 100 may be integral with the duct 12, as shown, or may be a separate annular ring of metal that may be secured to the duct 12 by welding or with fasteners (not shown). Existing duct may therefore be retrofitted with the flange 100 where it is desired to provide an existing duct system with the damper access assembly 18. Similar to the joint between the damper access duct section 44 and the adapter 46, the joint between the duct 12 and the damper access assembly 18 may include a direct abutting relationship between the flange 60 and the flange 100. The clamp 48 may then operatively couple the damper access duct section 44 to the duct 12, or a gasket (not shown) may separate the flange 60 from the flange 100 though the clamp 48 may operatively couple the damper access duct section 44 to the duct 12. The clamp 48 may be similar to the clamp 50, as shown in FIG. 5A or 5B, or may be a different clamp, such as those disclosed above.

Figure 7:
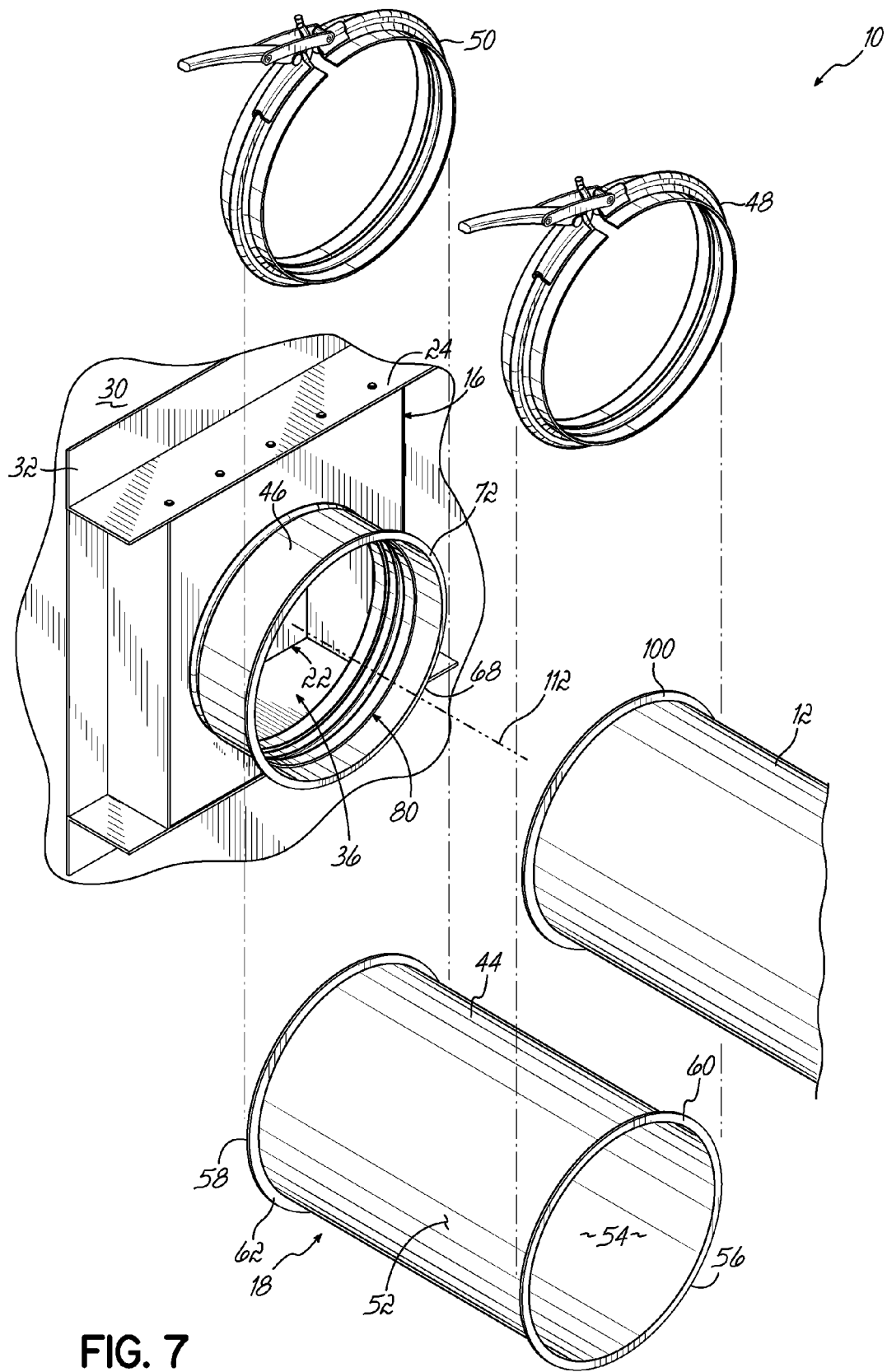
FIG. 7 is a partially disassembled perspective view of the embodiment of the invention shown in FIG. 2.

With reference now to FIGS. 2 and 7, as described above, once the damper access duct section 44 is removed from between the duct 12 and the adapter 46, a technician may directly access internal components of the duct system 10. For example, removing the damper access duct section 44 permits access to the damper 22 through the outlet 36 of the damper assembly 16. In contrast to access doors (not shown), which are often constructed into a side of a duct system and may only provide an angled access to the damper 22, according to embodiments disclosed herein, the technician may access the damper 22 more directly along a longitudinal axis 112, which may correspond to the longitudinal axis of the duct 12. Thus, in one embodiment, the duct system 10, as shown in FIG. 1, does not require an access door or panel. In addition, although not shown and not required to gain access to the internal components of the damper assembly 16, the adapter 46 may also be slipped off of the collar 80. This may only require removal of the fasteners 98, as shown in FIG. 4, and pulling the adapter 46 in the direction of the duct 12 to slip the adapter 46 from the collar 80.

Specifically, in one embodiment and with reference to FIG. 7, to remove the damper access duct section 44 from the duct system 10, a technician may disengage the clamps 48 and 50 from the corresponding joints between the damper access duct section 44 and the adapter 46 on the one end and between the damper access duct section 44 and the duct 12 at the other end. In this regard, the clamp 48 may be disengaged from the flanges 60 and 100 so that the damper access duct section 44 and the duct 12 may be movable relative to one another at this joint. The technician may then disengage the clamp 50 from the flanges 62 and 72 so that the damper access duct section 44 and the adapter 46 may be movable relative to one another at that joint. Removing each of the clamps 48 and 50 accordingly releases the damper access duct section 44 from the duct system 10. The technician may therefore remove the damper access duct section 44 and set it aside for performing inspection, maintenance, and/or repair of the internal components of the damper assembly 16, such as the damper 22. It will be appreciated that removal of the damper access duct section 44 is achieved without bending, cutting, or other permanent damage to the adapter 46 or the duct 12 so that each may be reused when the damper access duct section 44 is reattached thereto.

Once the inspection and/or maintenance of the internal components of the damper assembly 16 is complete, the technician need only reposition the damper access duct section 44 between the adapter 46 and the duct 12 to align the flanges 60 and 100 and flanges 62 and 72. Once aligned, clamps 48 and 50 may be brought into communication with the respective flanges and then reengaged to thereby operatively couple the damper access duct section 44 to each of the duct 12 and the adapter 46.

Figure 8:
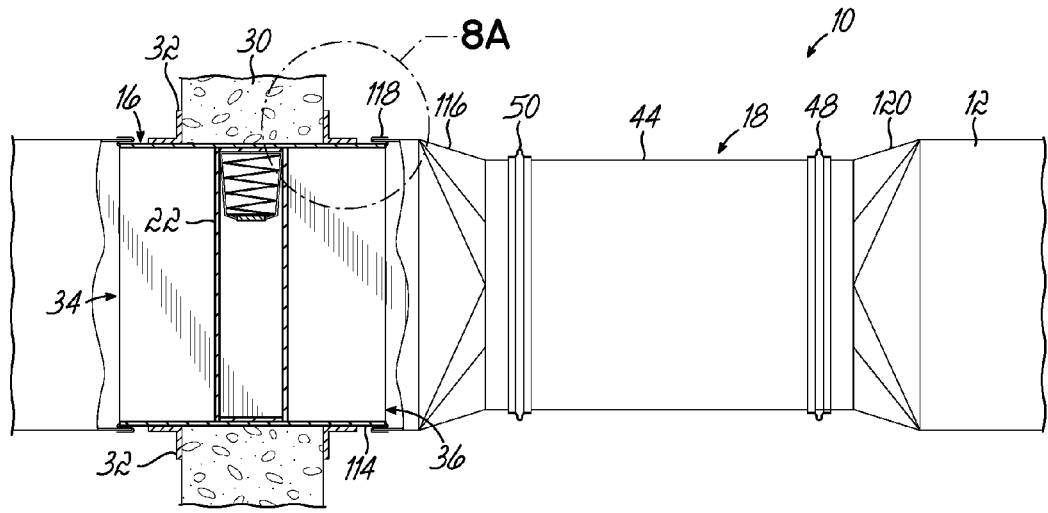
FIG. 8 is a partial cross-sectional plan view of another embodiment of the invention.
Figure 8A:
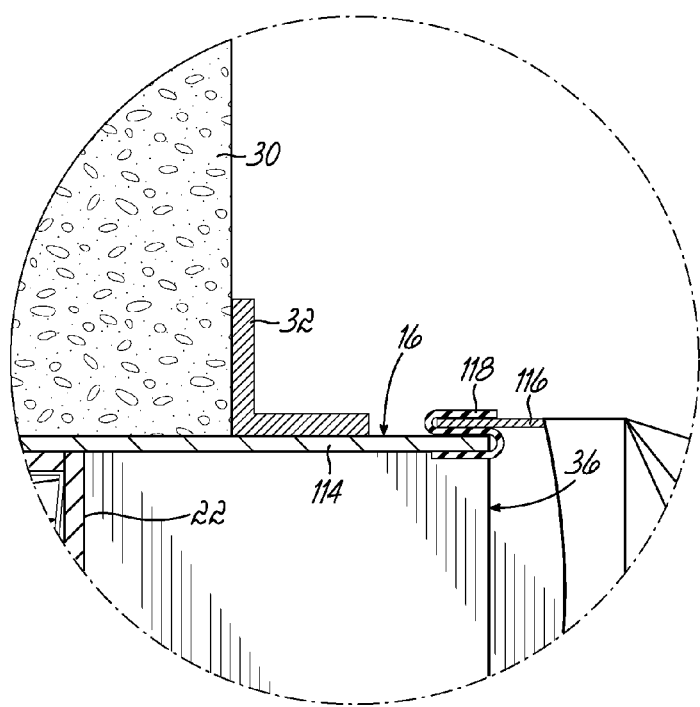
FIG. 8A is an enlarged view of the encircled area 8A in FIG. 8.

With reference now to FIG. 8, in which like reference numerals refer to like features in the figures, the damper enclosure 24 is a wall sleeve 114. Unlike the damper enclosure 24 having sidewalls and endwalls, as shown in FIG. 2, for example, the damper enclosure of this embodiment in the form of the wall sleeve 114 may be a tubular configuration, for example, a rectangular configuration. In this embodiment, the wall sleeve 114 is secured to the wall 30 by the retaining angles 32. The wall sleeve 114 thereby defines the inlet 34 and the outlet 36 in such a manner so that the inlet 34 and the outlet 36 are substantially the same cross-sectional area as the sleeve 114. It will be appreciated that by such a configuration the blades 26 and the frame 28 may extend directly into the flow of fluid within the sleeve 114. The damper access assembly 18 may include the damper access duct section 44 and an adapter 116 that may be a rectangular-to-round coupler to operatively couple to the rectangular-shaped outlet 36. The adapter 116 may be operatively coupled to the wall sleeve 114 by a breakaway connection 118. With reference to FIG. 8A, the breakaway connection 118 may be one of many ductsleeve connections as provided in UL555, sixth edition, including, for example, a plain "S" slip, a hemmed "S" slip, a double "S" slip, an inside slip joint, and a standing S. At the other end of the damper access assembly 18, the damper access duct section 44 may be coupled to a round-to-rectangular portion 120 of the duct 12.

Figure 9:
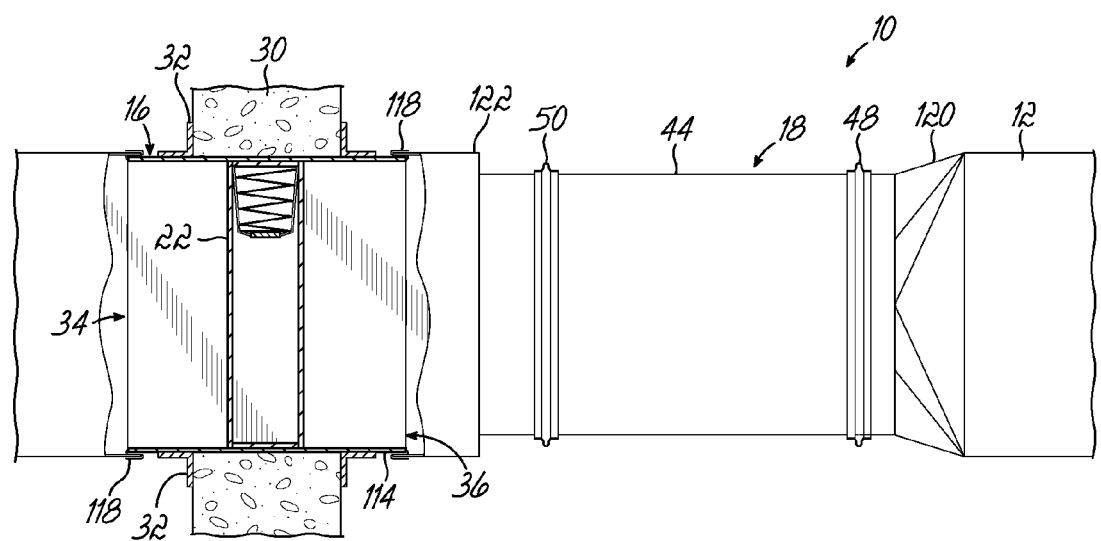
FIG. 9 is a partial cross-sectional plan view of another embodiment of the invention.

In another embodiment of the invention, as shown in FIG. 9, the damper access assembly 18 may include an adapter 122. The adapter 122 may be another configuration of a rectangular-to-round coupler that cooperates with a rectangular wall sleeve 114.

It will be appreciated that, in each of the embodiments shown in FIGS. 8, 9, and 10, the damper access duct section 44 may be removed and reinserted in a manner similar to that described above with regard to FIG. 7.

While the present invention has been illustrated by description of various embodiments and while those embodiments have been described in considerable detail, it is not the intention of applicants to restrict or in any way limit the scope of the appended claims to such details. Additional advantages and modifications will readily appear to those skilled in the art. The invention in its broader aspects is therefore not limited to the specific details and illustrative examples shown and described. Accordingly, departures may be made from such details without departing from the spirit or scope of applicants' invention.

Having described the invention, what is claimed is:

1. A damper access assembly for use in a ventilation duct system including ductwork and a damper enclosure configured to enclose a damper and having an inlet and an outlet operatively coupled to the ductwork, the damper access assembly comprising:
   an adapter defining a passage therethrough and having a first end and a second end, the first end being configured to be operatively and removably coupled to one of the inlet or outlet of the damper enclosure and the second end including a first radially outwardly directed flange; and
   a rigid damper access duct section defining a passage therethrough and having a first end and a second end, each of the first end and the second end of the damper access duct section including a second radially outwardly directed flange at the respective first end and second end thereof,
   wherein the first flange of the adapter is configured to be operatively and releasably coupled to one of the second flanges of the damper access duct section at one of the first or second ends thereof and the other second flange at the other of the first or second end of the damper access duct section is configured to be operatively and releasably coupled to the ductwork so that the damper access duct section is removable relative to the damper enclosure and the ductwork to permit access to the damper when the damper access duct section is removed.

2. The damper access assembly of claim 1, further comprising:
   a clamp that cooperates with the first flange and one of the second flanges, the clamp being configured to releasably couple the damper access duct section to the adapter.

3. The damper access assembly of claim 2, wherein the clamp includes a gasket that is configured to sealingly engage the first flange and the second flange at the one end of the damper access duct section.

4. The damper access assembly of claim 2, further comprising:
   a second clamp that cooperates with the other one of the second flanges and is configured to releasably couple the damper access duct section to the ductwork.

5. The damper access assembly of claim 1, further comprising:
   a collar configured to be operably coupled to one of the inlet or outlet of the damper enclosure, wherein the collar is configured to slidably engage the adapter.

6. The damper access assembly of claim 5, further including a gasket that is configured to be between the adapter and the collar and provide a fluid-tight seal therebetween.

7. A ventilation duct system, comprising:
   ductwork;
   a damper enclosure having an inlet and an outlet operatively coupled to the ductwork;
   a damper enclosed within the damper enclosure; and
   a damper access assembly comprising:
      an adapter defining a passage therethrough and having a first end and a second end, the first end being operatively and removably coupled to one of the inlet or outlet of the damper enclosure and the second end including a first radially outwardly directed flange; and
      a rigid damper access duct section defining a passage therethrough and having a first end and a second end, each of the first end and the second end of the damper access duct section including a second radially outwardly directed flange at the respective first end and second end thereof,
      wherein the first flange of the adapter is operatively and releasably coupled to one of the second flanges of the damper access duct section at one of the first or second ends thereof, and the other second flange at the other of the first or second ends of the damper access duct section is operatively and releasably coupled to the ductwork, so that the damper access duct section is removable relative to the damper enclosure and the ductwork to permit access to the damper when the damper access duct section is removed.

8. The ventilation duct system of claim 7, wherein the damper is selected from a group consisting of a fire damper, a balancing damper, a control damper, a fire smoke damper, a backdraft damper, and a smoke damper.

9. The ventilation duct system of claim 7, further including:
   a clamp that cooperates with the first flange and with one of the second flanges and is configured to releasably couple the damper access duct section to the adapter.

10. The ventilation duct system of claim 9, further including:
    a second clamp that cooperates with the other one of the second flanges and is configured to releasably couple the damper access duct section to the ductwork.

11. The ventilation duct system of claim 7, further including:
    a collar operatively coupled to one of the inlet or outlet of the damper enclosure and configured to slidably engage the adapter.

12. The ventilation duct system of claim 11, wherein one of the collar and adapter includes a gasket that provides a fluid-tight seal therebetween.

13. A damper assembly for use in a ventilation duct system including ductwork having a damper, the damper assembly comprising:
    a damper enclosure having endwalls that define an inlet and an outlet for operatively coupling the damper enclosure to the ductwork, the damper enclosure configured to house the damper;
    a collar extending from at least one of the inlet and the outlet;
    a gasket disposed on the collar;
    an adapter defining a passage therethrough and having a first end and a second end, the first end being configured to be operatively and removably engaged with the collar so that the gasket sealingly engages with the passage and the second end including a first radially outwardly directed flange;
    a rigid damper access duct section defining a passage therethrough and having a first end and a second end, each of the first end and the second end of the damper access duct section including a second radially outwardly directed flange,
    wherein the first radially outwardly directed flange is operatively and removably coupled to the second radially outwardly directed flange at the first end of the rigid damper access duct section and the rigid damper access duct section is operatively and releasably coupled to the ductwork at the second end so that the rigid damper access duct section is removable to permit access to the damper and is reattachable to the damper enclosure and the ductwork following removal.

* * * * *